May 1, 1973  W. A. HAGGERTY  3,730,861
METHOD OF ELECTROCHEMICAL MACHINING
Filed April 8, 1968  3 Sheets-Sheet 1
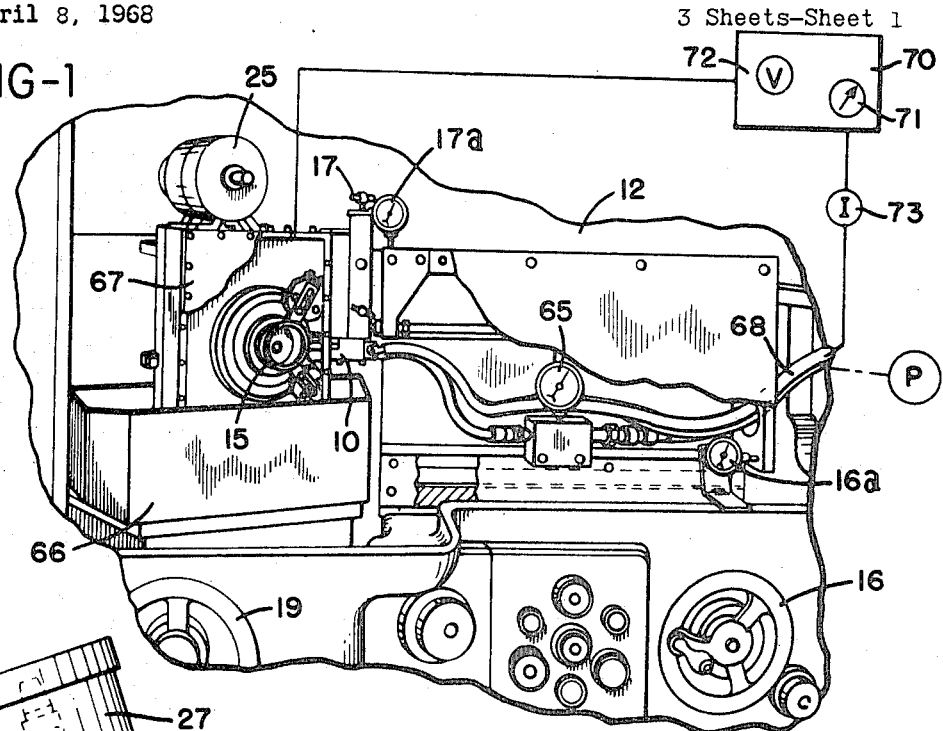
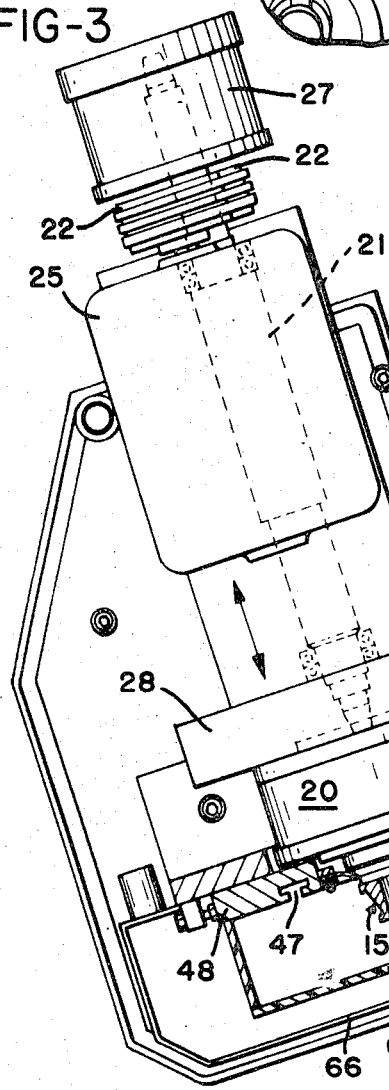
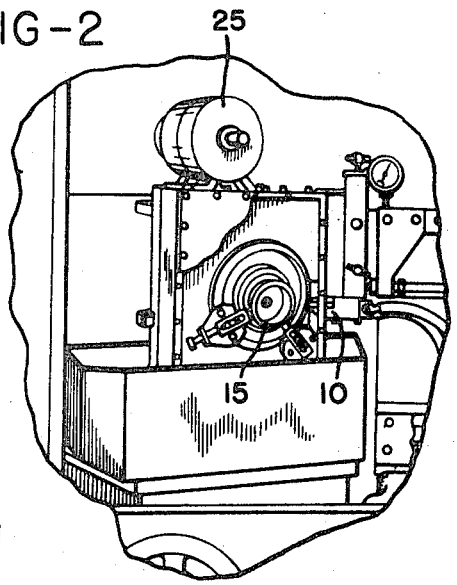
INVENTOR
WILLIAM ANDREW HAGGERTY
BY
Marechal, Biebel, French & Bugg
ATTORNEYS

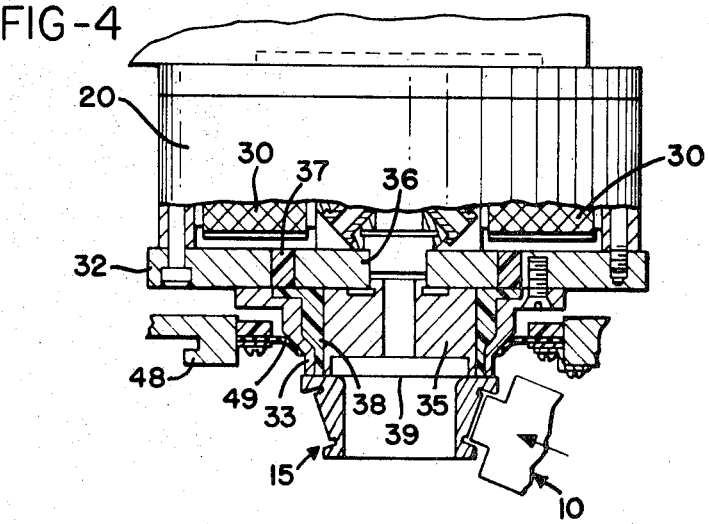
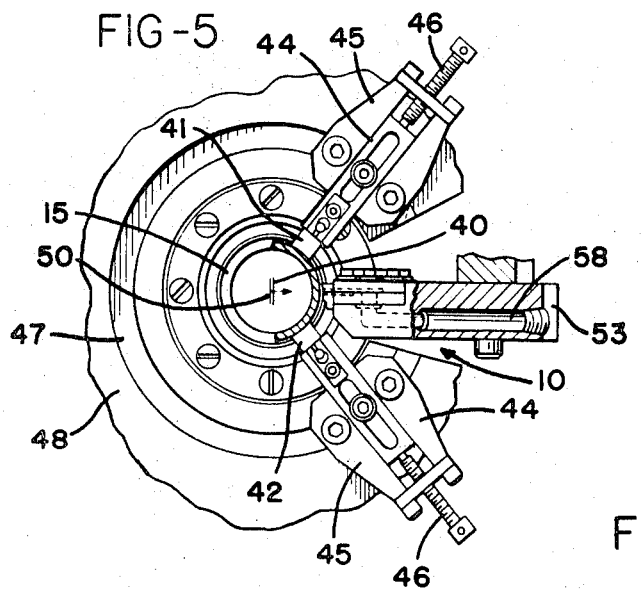
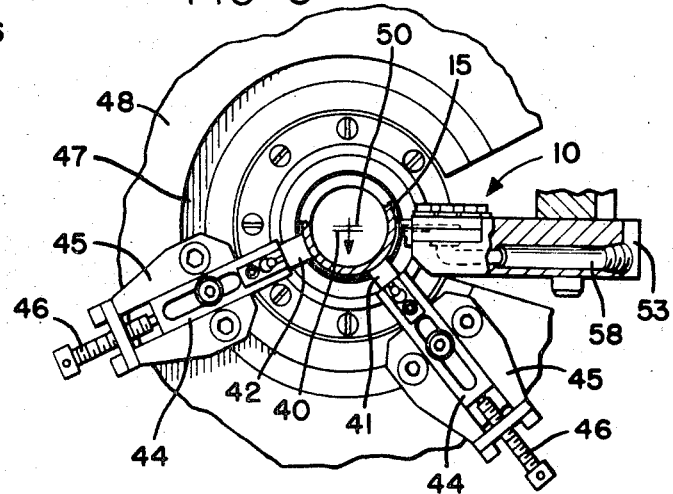

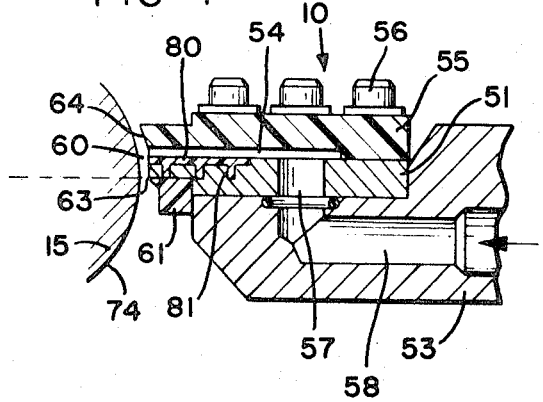
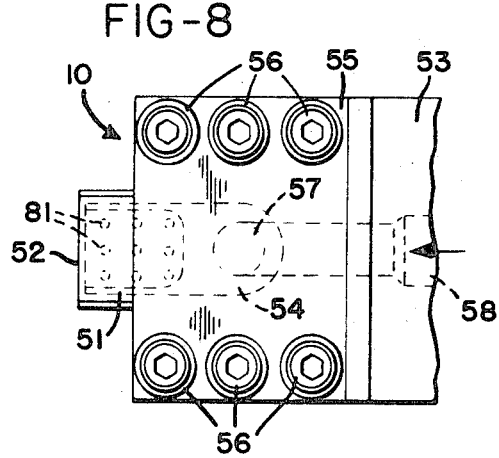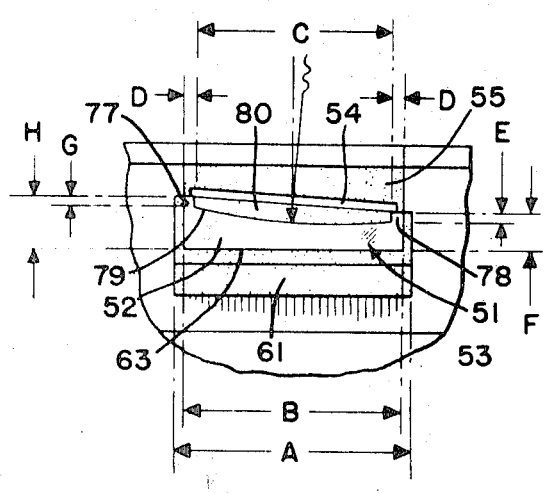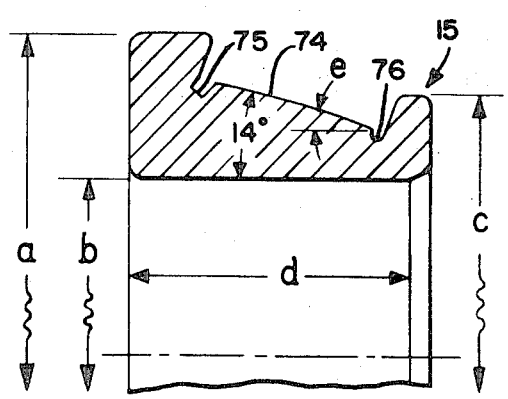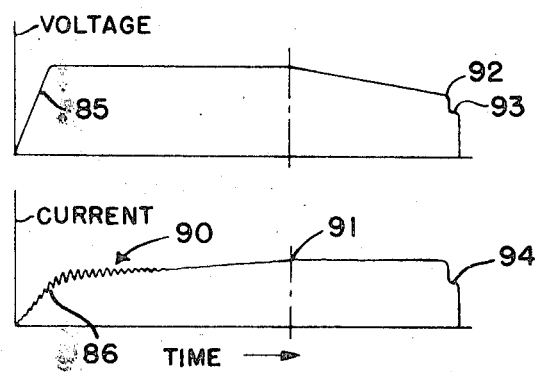

3,730,861
METHOD OF ELECTROCHEMICAL MACHINING
William Andrew Haggerty, Cincinnati, Ohio, assignor to
The Cincinnati Milling Machine Co., Cincinnati, Ohio
Filed Apr. 8, 1968, Ser. No. 719,450
Int. Cl. C23b 3/02, 3/12; B23k 1/00
U.S. Cl. 204—129.75                                    9 Claims

ABSTRACT OF THE DISCLOSURE

A method of electrochemical machining workpieces to form surfaces of revolution having precise shapes and dimensions includes the steps of rotating the workpiece and positioning an electrochemical machining tool adjacent the workpiece with the gap between the tool and the workpiece being adjusted initially to a first distance. A high velocity flow of electrolyte is forced under pressure into the gap between the tool and the workpiece to provide a path for the electrical current, to remove the heat generated during the machining operation, and to remove the reaction products of the machining operation. The current density between the workpiece and the tool is maintained at the highest possible level for substantially the entire machining operation, in the order of 6000 amperes per square inch, to obtain the highest quality surface finish and the best machining rates. After the workpiece has been machined to its finish dimension, the current may be reduced momentarily, for at least one revolution of the workpiece to a lower predetermined level, typically between 1500 and 3000 amperes per square inch, to produce a bright, pleasing appearance to be machined surface. The current is then terminated abruptly in order to maintain this bright surface appearance completely around the bearing surface.

RELATED APPLICATIONS

Reference is hereby made to copending United States application Ser. No. 719,451, now U.S. Pat. 3,591,493, entitled Method and Apparatus for Electrochemically Machining Rotating Parts, and Ser. No. 719,452 entitled Method and Apparatus for Electrochemically Machining Rotating Parts, both applications filed on even date herewith.

BACKGROUND OF THE INVENTION

In the preparation of the bearing races, usually the bearing is first formed by turning on a screw machine and then heat treated to carburize the outermost surface layer. The outside faces of the bearing are then ground parallel to each other to define the total length of the bearing. Finally, the bearing surface is rough ground to approximately the desired outside diameter, finish ground, and then honed to obtain proper surface finish and diameter. Each of these three last mentioned steps requires separate machining operations.

It has been found that these several grinding operations can be eliminated or reduced by using the electrochemical machining process, and in this example the rough or finish grinding as well as the honing operation can be replaced and more accurately and more quickly accomplished by using electrochemical machining. Furthermore, more complicated surface configurations can be obtained by electrochemical machining, such as crowning the bearing surface to increase the load carrying capacity of a bearing, with each part machined having exactly the same configuration as every other part since the tool which does the machining is not worn or in any way modified during successive machining operations.

It has also been found that the highest machining rates and the smoothest possible surface finish are obtainable only at relatively high current densities, in the order of 6000 amperes per square inch. However, at such high current densities, the resultant surface has a hazy, straw-colored appearance. At intermediate current densities, typically in the order of 1500 to 3000 amperes per square inch, the surface finish is bright, having no apparent oxide coating thereon, however, this current density does not produce the fastest cutting rate nor the smoothest finishes possible from the electrochemical machining process. At lower current densities, an oxide forms on the surface of the part being machined which gives the part a black, dirty appearance.

SUMMARY OF THE INVENTION

This invention relates to a method for electrochemically machining a workpiece to form a surface of revolution to precise dimensions and to smooth surface finishes which have a bright appearance, and which have no apparent oxide coating thereon.

More particularly, the method of this invention includes the steps of rotating a workpiece about a center of rotation, placing an electrochemical machining tool adjacent the workpiece and initially adjusting the gap between the tool and the workpiece, supplying a high velocity flow of electrolyte under pressure into the gap to provide a path for the electrical current flow and to remove the heat and the reaction products of the electrochemical machining operation, maintaining the magnitude of the current flow at the highest possible current level, typically in the order of 6000 amperes per square inch, to provide high machining rates and a smooth surface finish, maintaining that current density until the workpiece has been machined to its desired dimensions, and then momentarily lowering the current density to a second predetermined level, typically between 1500 and 3000 amperes per square inch, for at least one revolution of the workpiece to provide a bright surface finish. Since current densities lower than approximately 1500 amperes per square inch will leave a black oxide coating on the workpiece, it is essential that the current density be lowered immediately to a zero value at the termination of the machining operation, otherwise a black line will appear on the rotating part as a result of the lower current density during the time the power supply is being disconnected.

Since the highest possible current densities provide the fastest machining rates and the smoothest surface finishes, these current densities are used in the method of this invention with the maximum current density being determined primarily by the current carrying capacity of the tool.

Among the considerations given in limiting the maximum current flow is the fact that when the workpiece is initially installed for rotation, it may be out of round thereby causing the gap distance between the workpiece and the tool to vary considerably as the workpiece is rotated. Also, a differential taper may exist between the tool and the workpiece causing the gap distance to vary across the face of the tool. Since current density is a function of gap distance for any given voltage, the current through the tool must be limited to a value below that which causes damage to the tool from melting, arcing, or distortion caused by the heat generated by the passage of current through the tool. By riding on support shoes, the initial operation effects rounding out of the workpiece with a minimum removal of stock.

Preferably, a gap distance of approximately 0.0015 inch is established between the tool and the workpiece at the completion of the machining operation. At this gap dimension, 6000 ampere per square inch current density, the highest current density deemed safe for the particular tool described in this application, can be obtained by maintaining a voltage between the tool and the workpiece of approximately fifteen volts. With some apparatus used to perform the method of this invention, the gap distance at the beginning of the machining operation may vary to as much as three or four times final gap distance, and in order to maintain the same high current density, it would be necessary to raise the voltage. Since this higher voltage may result in localized currents within the tool which exceed its current carrying capacity, the voltage, and as a result the current through the tool, is limited, especially during the initial rounding up of the workpiece, to a value which permits rapid removal of workpiece material while at the same time prevents damage to the tool.

In the preferred embodiments, the means supplying the current for the electrochemical machining operation is capable of maintaining any preselected voltage even though the current may vary. This is especially important during the initial rounding up of the part since the gap dimension is constantly changing and with a smaller gap dimension higher current flow will result in faster machining. Thus, the high spots on the part are removed at a faster rate and eventually the part becomes rounded. In order to maintain the surface finish at a high degree of smoothness throughout the circumferential extent of the machined surface, the power supply must be substantially ripple free, that is the variation in its voltage output must be less than one half of one percent, peak to peak. The power supply should also have a response characteristic sufficient to hold the voltage constant over a five to one variation of current with the frequency of this variation being determined by the maximum anticipated speed of rotation of the workpiece. With the apparatus described herein, a ten cycle per second response is considered adequate.

By machining electrochemically in accordance with the method of this invention, the workpiece may be machined to within a dimension of 0.000100 inch, an out of round tolerance of 0.000100 inch, and to a surface finish having less than five microinch variation, arithmetic aperage, with two to two and one half microinch finishes having been obtained in experimental runs.

The method of this invention may be practiced using at least two different apparatus. While other means may be employed to rotate the workpiece, such as rotating the workpiece between centers or by a mandrel, the workpiece preferably is supported by a magnetic chuck for rotation about an axis of rotation. The center of the workpiece is displaced from the center of rotation by a pair of shoes engaging the machined surface of the workpiece. Thus, as the workpiece rotates, it will have a tendency to align its center with the center of rotation, but being displaced by the shoes, the workpiece will therefore be positively urged toward the shoes and thus its center will move toward the center of rotation as material is removed electrochemically from the machined surface.

In one apparatus, described and claimed in the above mentioned United States application Ser. No. 719,452, the electrochemical machining tool is positioned between these shoes and therefore the gap between the tool and the workpiece decreases as the machining operation progresses. As the gap dimension becomes smaller, the voltage between the tool and the workpiece is reduced in order to maintain the current density at a substantially high level, but below that level which may cause damage to the tool. Preferably the current is maintained constant, and when the voltage required to accomplish this is reduced to a predetermined value, indicating that the gap has been reduced to a predetermined distance, the workpiece will be at its final dimension. Therefore, the voltage required to maintain the current at a constant high level is a direct indication of the diameter of the workpiece and may be referred to by the machine operator or by automatic equipment to determine when the electrochemical machining operation is to be terminated.

In the other apparatus, described and claimed in the above mentioned United States application Ser. No. 719,451, the electrochemical machining tool is positioned adjacent the workpiece on a line essentially normal to the line extending between the center of the workpiece and the center of rotation. As the workpiece is machined to a smaller diameter, its center moves substantially parallel to the tool, and consequently it is desired that the essentially flat frontal machining surface of the tool be positioned so that it will be normal to a line passing from the tool through the center of the workpiece when the machining operation is completed. The tool may be fixed relative to the workpiece and thus allow the gap to increase as material is removed, or the tool may be moved toward the workpiece at the same rate as material removal to maintain the gap distance constant. In either case, the current density is maintained at the desired high level by adjusting the voltage between the tool and the workpiece.

Accordingly, it is an object of this invention to provide an improved method for electrochemically machining a rotating workpiece to a smooth finish having a bright appearance including the steps of machining the workpiece at a high current level to provide a smooth surface finish until the desired dimensions are obtained, momentarily lowering the current level to a predetermined level to provide a bright surface finish free of apparent oxide coating, and then reducing the current density to a zero value to terminate the machining operation.

It is another object of this invention to provide an improved method for electrochemically machining workpieces to form a surface of revolution by mounting each workpiece for rotation past an electrochemical machining tool mounted initially a predetermined distance from the workpiece, supplying electrolyte under pressure to produce high velocity flow between the tool and the workpiece, providing a high density electrical current from a substantially ripple free power supply to remove workpiece material anodically as the workpiece rotates past the tool, keeping the current density at a relatively high level until the workpiece is machined to the desired dimensions, the current density being of such magnitude that surface finishes in the order of less than five microinch, arithmetic average, result during the machining operation, lowering the current density to a predetermined magnitude for at least one revolution of the workpiece immediately prior to terminating the machining operation to remove the discoloring effects inherently resulting from the machining at hgh current densities therefore to provide a bright surface finish on the workpiece, and terminating the current flow suddenly after the workpiece has been machined at said second predetermined level.

BRIEF DESCRIPTION OF THE DRAWINGS

FIG. 1 is a front elevational view showing the overall arrangement of the various components which comprise one embodiment of the electrochemical machining apparatus used in performing the method of this invention;

FIG. 2 is a front elevational view showing a portion of another apparatus used in performing the method of this invention;

FIG. 3 is a plan view of the electrochemical machining apparatus showing the workpiece drive assembly, the electrochemical machining tool, and a portion of the mechanism supporting the tool;

FIG. 4 is a plan view partially in cross section of the electromagnetic chuck for holding the workpiece;

FIG. 5 is a front elevational view, with the workpiece partially in cross section, showing means slidingly engaging the machined surface of the workpiece at spaced apart locations to displace the center of the workpiece from the center of rotation of the supporting magnetic chuck, and also showing, partially in cross-section, the electrochemical machining tool positioned between the sliding means;

FIG. 6 is a view similar to FIG. 5 showing the electrochemical machining tool positioned approximately at right angles to a line bisecting the space between the two sliding means;

FIG. 7 is an enlarged cross sectional elevational view of the electrochemical machining tool used in the preferred embodiment of the invention;

FIG. 8 is an enlarged plan view of the electrochemical machining tool;

FIG. 9 is an enlarged end view of the electrochemical machining tool;

FIG. 10 is an enlarged cross sectional view of the workpiece; and

FIG. 11 is a graph showing the voltage and current flow during the machining operation with respect to time with the curve in FIG. 11a representing the voltage between the tool and the workpiece and with the curve in FIG. 11b representing the total current flow through the tool.

DESCRIPTION OF THE PREFERRED EMBODIMENT

Referring now to the drawings, and to FIGS. 1 and 3 particularly, the electrochemical machining apparatus of this invention includes an electrochemical machining tool 10 mounted on a supporting means 12 which adjustably supports the tool relative to a workpiece 15. In the embodiment shown, in these figures, the tool may be moved laterally by handle 16 with the position of the tool being indicated by the gage 16a, vertically by turning the handle 17 with the position indicated by the gage 17a, and rearwardly by an adjusting handle 19. While the form of tool support shown is particularly useful, it is to be understood that other means of supporting the tool relative to the workpiece may be employed without departing from the scope of this invention. Once the position of the tool is adjusted properly, it will remain fixed throughout the machining operation.

The workpiece 15 is supported on a magnetic chuck 20 which is carried by a shaft 21, the latter being rotated by belts reeved on pulleys 22 attached to the shaft of the motor 25. A slip ring assembly 27, shown generally in FIG. 3, carries the electrical current for the electrochemical macnining operation through the shaft 21 to the workpiece 15.

Referring to FIG. 4, the magnetic chuck 20 receives electrical current through a slip ring assembly 28 which applies this current to a pair of coils 30 located within the chuck 20. The current through these coils generates a magnetic field which passes from one pole of the coils 30, through the cylindrical housing 31, an outer plate 32 to an outer collar 33, through the workpiece 15, an inner collar 35, an inner plate 36 and then to the other pole of the coils 30. A ring 37 of magnetically insulating material separates the plates 32 and 36 and an insulating collar 38 separates the collars 33 and 35. This arrangement permits the maximum number of magnetic lines of force to pass through the workpiece 15 thus holding it securely against the forward face 39 of the chuck 20. This face 39 is maintained relatively smooth to permit free lateral movement of the workpiece 15.

Referring now to FIG. 5, which shows one apparatus for performing the method of this invention, the workpiece 15 is displaced from the center of rotation 40 of the magnetic chuck 20 by means of two spaced apart shoes 41 and 42 having a workpiece engaging surface formed to the same contour as the surface of the workpiece 15 which will undergo the electrochemical machining operation. These shoes are constructed of a material, such as tungsten carbide or ceramic, having sufficient hardness so that they will not be appreciably worn by abrasion with the surface of the workpiece. Alternatively, these shoes may be rollers against which the workpiece is urged by a roller or belt type driver means.

Each of the shoes 41 and 42 is pivotally attached to a radially extending arm 44 which may slide within a tool holder 45 and which may be positioned radially by the screw 46. The pivotal attachment between the arm 44 and the shoes permits the shoes to follow the workpiece generally as it is machined and moves toward the tool 10 due to the natural tendencies for the center of the workpiece to align itself with the center of rotation. The holders 45 are adjustably mounted within a T-shaped slot 47 formed in a plate 48 (see also FIG. 3). The plate 48 has a generally circular opening in its central portion through which the collar 33 of the magnetic chuck 20 extends. A rubber gasket 49, shown in FIG. 4, extends from the plate 48 into the opening and engages the outer surface of the collar 33 to prevent electrolyte from flowing behind the plate 48 and into the magnetic chuck 20 or the rotating parts of the chuck structure.

The holders 45 are adjusted within the slot 47 at approximately a 120° angle with respect to each other and the shoes 41 and 42 are moved radially inwardly to displace the workpiece 15 along the line which generally bisects the angle between these two shoes. Initially, the center 50 of the workpiece 15 is positioned approximately 0.025 inch from the center of rotation 40 of the magnetic chuck 20 for the part hereinafter described.

An electrochemical machining tool 10 is positioned approximately midway between the shoes 41 and 42 and is adjusted to provide a gap of a first predetermined dimension, typically 0.001 inch, is provided between the machining surface of the tool and the workpiece. Since the machined surface of the workpiece slidably engages the shoes 41 and 42, the center 50 of the workpiece will be urged toward the center of rotation 40, or to the right as viewed in FIG. 4, as the workpiece becomes smaller in diameter through the electrochemical removal of the workpiece material and thus decrease the gap distance between the tool and the workpiece.

The tool is positioned in line with the direction of movement of the center of the workpiece as the latter moves toward the center of rotation during reduction of its diameter due to the electrochemical removal of the workpiece material. As the gap distance decreases at any preselected maintained voltage, the current density will normally tend to increase. To prevent the current from exceeding the capacity of the tool, the voltage between the workpiece and the tool is correspondingly decreased either manually by the machine operator or automatically through the use of constant current electronic circuits.

Another embodiment, also useful in performing the method of this invention, is shown in FIGS. 2 and 6. The workpiece 15 is displaced upwardly from the center of rotation 40 approximately 0.025 inch by the shoes 41 and 42. The tool 10 is positioned at approximately right angles to the path of movement of the workpiece as the material is electrochemically removed and the center of the workpiece 15 moves downwardly toward the center of rotation 40. The tool has its frontal or machining surface parallel to the axis of rotation and also essentially parallel to the direction of movement of the workpiece toward the center of rotation.

In the embodiment shown in FIG. 6, the tool may remain stationary throughout the machining operation, the gap between the tool and the workpiece will increase as material is removed, and unless the voltage is increased by a corresponding amount, the current density will tend to decrease. Since it is desirable that the current density be maintained at a substantially constant high magnitude throughout the machining operation to provide the smoothest possible surface finishes, the current is controlled, either manually or automatically through the use of constant current circuits, by increasing the voltage. In FIG. 6, the tool also may be moved into the workpiece at the same rate as the workpiece material is removed, thus maintaining the gap distance at a constant value, the current density will inherently remain at a substantially constant value for a given voltage level.

The electrochemical machining tool is shown in detail in FIGS. 7 through 9 and includes an electrically conductive plate 51 having a frontal machining surface 52 which is machined and lapped flat. This electrically conductive plate may be made out of brass or other similarly easily machined metal capable of carrying high electrical current levels.

An electrolyte passage 54 is provided by mounting an upper insulating block 55 onto the plate 51 and securing both to the tool holder by means of screws 56. This passage communicates with an opening 57 extending through the plate 51 into the tool holder 53. A passageway 58 in the tool holder carries the electrolyte from the supporting equipment into the tool, through the opening 57 and the passage 54 into the gap 60 between the tool and the workpiece.

An additional insulating block 61 is secured to the plate 51 in the area next to the workpiece to prevent any stray electric currents from machining the workpiece thereby limiting the machining action to the frontal surface 52 of the tool. This block is tapered inwardly from the frontal machining surface thus increasing the gap dimensions allowing the electrolyte to escape from the machining area. Both the blocks 55 and 61 may be formed from a rigid and non-conductive fiberglass laminate, such as Formica type FF91, which also has low moisture absorption characteristics.

In both the embodiments shown in FIGS. 5 and 6, the lower edge 63 of the tool is essentially straight and is aligned parallel to the axis of the workpiece with this edge being closer to the workpiece than any other portion of the tool. Preferably, when using a single tool, the frontal machining surface 52 is aligned perpendicular to the line between the center of the workpiece and the edge 63 of the tool when the workpiece has been machined to its final dimension.

The lower surface of the block 55 and the upper surface of the plate 51 are made relatively smooth in the area of the electrolyte passage 54 to facilitate the smooth flow of the electrolyte into the gap 60. Also, the frontal surface 64 of the insulating block 55 is curved or inclined as shown in FIG. 5 to provide a substantially constant gap distance and thus to urge the electrolyte to flow downwardly over the frontal machining surface of the tool as the workpiece rotates in a clockwise direction.

A high velocity flow of electrolyte is supplied by a pump in to the gap 60 formed between the plate 51 and the workpiece at a pressure of approximately 350 p.s.i. as observed by the gage 65. The particular electrolyte composition depends upon the type of material being machined. For iron base materials, the electrolyte solution is prepared by mixing four pounds of sodium nitrate per gallon of water. This electrolyte is maintained at substantially ambient temperature, and as it passes from the gap 60, it is collected in a tray 66 (FIG. 1) located beneath the tool and returned to the recirculating equipment where the anodic products of the reaction are removed, as by a centrifugal separator, and where the electrolyte is cooled prior to being returned to the machining area. A shield 67 (FIG. 3) is constructed around the tool and the workpiece in order to prevent the electrolyte from being sprayed on the machine operator and on the other components of the apparatus.

Power is supplied to the tool 10 through its tool holder by means of cable 68 and the workpiece through the slip ring assembly 27 and the shaft 21, with the workpiece being made anodic with respect to the tool. The means supplying the current between the tool and the workpiece is of conventional design, but of high quality since it must supply a variable direct current of between zero and forty volts, and be essentially ripple free, that is contain less than one half of one percent, peak to peak, variation in its voltage level. An essentially ripple free power supply is necessary in order to obtain the accurate dimensioning and smooth surface finishes necessary for machining bearings. Furthermore, the power supply should have a response characteristic sufficient to hold the voltage constant over a five to one variation in current, the frequency of the variation being determined by the maximum speed of rotation anticipated. A ten cycle per second response is considered sufficient for the embodiment described herein.

A power supply means 70 shown in FIG. 1 includes a voltage control 71, with the voltage output being indicated by the meter 72, and the current flow to the tool being indicated by the ammeter 73. While manual means are shown to adjust the voltage level, it is contemplated that automatic means may also be used.

The depth to which metal is removed during each revolution of the workpiece is determined by many factors including the rate of movement of the workpiece material relative to the face of the tool, the length of the tool face in the direction of relative movement, the voltage and gap between the tool and the workpiece, electrolyte composition and temperature, and the feed rate or relative radial motion between the tool and the workpiece.

In the embodiments of the invention described herein, the rate of rotation of the workpiece and the electrolyte composition and temperature are held constant by the supporting equipment. The current density may be maintained at a substantially constant level by controlling the power supply voltage. Thus, if the gap becomes smaller, as is the case in the embodiment shown in FIG. 5, the voltage between the tool and the workpiece is reduced during the machining operation, however, if the gap becomes larger, as may be the case in the embodiment shown in FIG. 6 if the tool is not fed toward the workpiece at the same rate that metal is removed, the voltage is increased to maintain the current density at a substantially constant high pre-determined level.

The magnitude of the peak current is maintained at a first predetermined level normally greater than 3000 amperes per square inch and preferably in the order of 6000 amperes per square inch until the diameter of the bearing surface reaches the desired dimensions. The highest current levels are maintained within the capacity of the tool in order to provide high rates of metal removal and a surface finish of less than five microinch, arithmetic average. However, a ferrous workpiece machined at these high current levels with sodium nitrate electrolyte will have a hazy, strawlike appearance. Therefore, the current density is lowered to a second predetermined level, typically between 1500 and 3000 amperes per square inch, for at least one revolution of the workpiece to provide a bright appearance to the surface finish. The current is then terminated quickly in order to prevent a black line on the surface which may occur if the electrochemical machining operation is allowed to continue at a lower current density.

With the apparatus shown in FIG. 5, the dimension of the workpiece may be determined by observing the voltage level necessary to maintain a constant current density at a first predetermined level. Therefore, when the voltage drops to a predetermined value, this indicates that the gap 60 has been reduced to a second predetermined distance, and at that time, the current density is reduced momentarily and then terminated.

With the apparatus shown in FIG. 6, the dimension of the workpiece is determined primarily by observing the readings on the dial 16a which indicate the lateral position of the tool 10 with respect to the center of rotation 40. In this embodiment, the tool may remain fixed relative to the center of rotation, especially when removing only small amounts of material, and in this case the voltage required to maintain a substantially constant current density is also an indication of the workpiece size and may be utilized to terminate the machining operation when the voltage is increased to a value which can be predetermined experimentally.

The length of the frontal machining surface in the direction of relative movement between the tool and the workpiece at the left end of the bearing surface 74 is made proportionately longer where the diameter of the workpiece is greater and therefore where the relative rate of movement between the workpiece and the tool is higher.

A typical workpiece 15, such as a bearing race, is shown in FIG. 10. Adjacent each end of the bearing surface 74 are two recesses 75 and 76 which serve primarily to allow the bearing surface to be machined precisely throughout its extent. While a conically shaped workpiece is described, it is to be understood that any rotating workpiece may be machined according to the principles outlined herein. As shown in FIG. 10, the recesses 75 and 76 adjacent the bearing surface 74 are formed by extended portions 77 and 78 at the extreme edges of the tool where the time of exposure to the workpiece is proportionately longer.

The following table illustrates typical dimensions for the tool and the workpiece shown in FIGS. 7 through 10.

| Tool | Inch |
|---|---|
| A | 0.800 |
| B | 0.760 |
| C | 0.690 |
| D | 0.035 |
| E | 0.031 |
| F | 0.118 |
| G | 0.026 |
| H | 0.133 |

| Workpiece | Inch |
|---|---|
| a | 3.000 |
| b | 1.500 |
| c | 1.750 |
| d | 1.500 |
| e | 14° |

The bearing surface 74 may be provided with a crown of approximately 0.000050 inch to facilitate the load carrying ability of the bearing and to increase its life. Providing such a crown on the bearing surface by conventional grinding methods is possible for only a few bearings, and is therefore costly in the production of a large number of bearings since the grinding tool must be resurfaced frequently. Using the electrochemical machining apparatus of this invention, the crown on the bearing surface is formed by modifying the area of the tool in the direction of relative movement by shaping the area of the frontal machining surface of the tool by milling, for example, since the depth of machining is proportional to the length of the tool in the direction of relative movement.

If the tool length is changed by 0.001 inch, then the rate of metal removal is changed by 0.00001 inch, a factor of 100 to 1. In FIG. 9, the surface 79 is a curve formed on a twelve inch radius on the perpendicular bisector of the line joining the ends of the tool 51. Thus, it is apparent that accurate machining of the tool to provide complicated surface finishes is well within the present state of the art, and the frontal machining surface of the tool is therefore maintained flat in order to remove any variations in machining rate due to the contour of the tool itself.

The material in the plate 51 which is cut away in order to provide the surface configuration for machining the particular workpiece shown in the drawings is filled with an insulating material 80, and the top surface of this material is machined flat with the top surface of the upwardly extending portions 77 and 78 to insure smooth electrolyte flow in the passage 55, as described above. A plurality of holes 81 may be formed through the plate 51 in the area machined away in order to assist in bonding the insulating material 80 to the plate.

The insulating material 80 also serves to prevent stray electrical current from the interior surface of the tool from degrading the surface finish of the workpiece. Since the distance between the workpiece and these interior surfaces is much greater than the gap between the workpiece and the frontal surface of the tool, the current densities from inside the tool will be lower than from the frontal surface. If a lower current density flow of current were permitted, the surface would not be as smooth as possible, and in addition the surface would have a black appearance.

Any irregularities in the interface between the tool and the insulation or any discontinuity in the frontal surface of the tool where the insulation joins the tool could cause a poor surface finish since these irregularities may cause turbulence in the electrolyte flow across the face of the tube or permit stray currents to flow from an internal surface of the tool to the workpiece. For this reason, the frontal surface of the tool and insulation are maintained coplanar.

The insulating material 80 is an epoxy type material (reaction product of epichlorohydrin and bisphenol A), and possesses essentially the same coefficient of thermal expansion as the material used for the tool. Additionally, the insulating material is non-porous, resistant to absorption of moisture for preventing passage of current through the insulating material to the workpiece, and relatively chemically inert with respect to the electrolyte being used. Typical insulating materials include a casting resin type RP-3260 available from Renn Plastics, Inc., of Lansing, Mich. or STYCAST casting resin type 2651 MM, available from Emerson and Cuming of Canton, Mass.

In operation, the magnetic chuck 20 is energized and a workpiece 15 placed on its forward face 39. The workpiece is displaced by approximately 0.025 inch from the center of rotation of the chuck along a line which intersects the center of rotation of the chuck and the finishing edge 63 of the tool by adjusting the shoes 41 and 42 radially inwardly. In the apparatus shown in FIG. 5, the tool is positioned so that a gap of a first predetermined distance, typically 0.006 inch, exists between its frontal machining surface and the surface of the workpiece to be machined. In a typical application of this invention, the workpieces are generally preformed to within a predetermined tolerance so that once the gap distance is established for one workpiece, the same gap distance may be used for all workpieces within a single production run. In the apparatus shown in FIG. 6, the gap is adjusted to approximately 0.001 inch and maintained at this distance by moving the tool toward the workpiece.

The motor 25 is then energized to rotate the workpiece at a speed of approximately 150 r.p.m. and the current density between the workpiece and tool is adjusted to the highest practical level, approximately 6000 amperes per square inch to provide the smoothest surface finish and the highest machining rates. Electrolyte is fed into the gap between the tool and the workpiece at a pressure of approximately 350 p.s.i. which gives an electrolyte flow velocity in the order of 400 to 500 feet per second. This high velocity flow insures adequate removal of the reaction products of the electrochemical machining operation.

With the apparatus shown in FIGS. 2 and 6, the tool may be fed toward the workpiece at the same rate that the workpiece material is removed to maintain the gap dimensions constant. In this case, the voltage and current density remain substantially constant throughout the machining operation, except during the initial rounding up of the workpiece. As the workpiece is machined, its center 50 moves on a line substantailly parallel to the machining surface of the tool and the center of rotation 40. Preferably, the finishing edge 63 of the tool will be closer than any other part of the tool to the workpiece when it has reached its final dimension. With this apparatus, the tool may also be fixed relative to the center of rotation, especially when removing small amounts of workpiece material, for example in the order of 0.003 inch. In this case, the voltage must be increased to compensate for the increase in the gap dimension if the current density is to be maintained at a constant high level.

With the apparatus shown in FIGS. 1 and 5, once the maximum current density is obtained the voltage is continuously reduced as the workpiece is machined and moves automatically toward the tool. In this case, when the voltage reaches a second predetermined lower value, this indicates that the gap has been reduced to a second predetermined distance, and thus the workpiece has been machined to its desired dimensions.

When the workpiece has been machined to the desired dimensions, the current density is lowered for at least one revolution of the workpiece to a second lower predetermined magnitude, typically between 1500 and 3000 amperes per square inch, to provide the machined surface with a bright appearance, and then the current is abrupty terminated to stop the electrochemical machining operation. A relay in the power supply circuit may be used to terminate the current flow abruptly. Since the workpiece rotates at a relatively high speed, the amount of material removed for each revolution is small, in the order of 0.000010 inch, and therefore when the current is removed, the discontinuity in the workpiece surface is also small.

FIG. 11 shows the relationship between the voltage and current during the machining operation with respect to time. In this example, the apparatus of FIG. 5 was used, however, the same principles of operation apply to the apparatus of FIG. 6. At the start of the electrochemical machining operation, the voltage, which is shown by curve 85 in FIG. 11a, is increased with a corresponding increase in the current, as shown by curve 86 in FIG. 11b. Since the power supply which was used during the machining operation of this example had a maximum voltage of 36 volts, the current did not obtain the desired high level initially. While this limitation in the capacity of the power supply existed in the embodiment described herein, it is obvious that a higher capacity power supply could be used to achieve the same results.

As shown generally at 90, the current fluctuates between two values indicating that the workpiece is out of round and therefore the gap distance is constantly changing as a result of the rotation of the part. As the machining operation continues, however, this fluctuation decreases indicating that the part is becoming round. As described previously, the power supply maintains its voltage constant for at least one revolution of the part so that the instantaneous value of the current is allowed to vary, thus machining the high spots on the workpiece at a faster rate than the low spots.

As workpiece material is removed, the gap becomes smaller, and as a result the current increases slowly until it reaches the first predetermined magnitude. The voltage has remained constant during this time of increase in current. When the peak current reaches its predetermined high level, shown at 91, it is maintained at that level by continuously reducing the power supply voltage as the gap dimension decreases. Once the voltage level has been reduced to a predetermined level, shown at 92, indicating that the part has now been machined to its desired dimensions, the voltage is reduced to a second value 93, to reduce the current to a second predetermined level at 94 for at least one revolution of the workpiece. The voltage is then reduced to zero as quickly as possible, as by opening the circuit by a relay, or by shorting the output of the power supply, to remove the flow of current and thus prevent any machining at a current density lower than the second predetermined current density. This preserves the appearance of the surface and its surface finish. Termination of the current in less than 100 microseconds is desired in order to minimize the thickness of the black line appearing on the surface. A line having a thickness of less than 0.001 inch is considered acceptable. With presently available equipment and techniques, the current may be brought to a zero value within approximately ten microseconds.

As mentioned above, when rounding up a part, a power supply having a constant voltage characteristic for at least one revolution of the part is used so that the current density increases when a high spot on the part approaches the tool. Thus, the machining rates for the high spots are higher than for the low spots, and eventually the part becomes round. However, in some applications, the power supplied may be connected to have a constant current characteristic so that a uniform layer of material may be removed, regardless of the out of round or other surface characteristics of the workpiece. In this case, the part will be first machined at the higher current density to provide the smooth surface finish, and then machined at a lower current density for at least one revolution to provide a bright surface finish.

Using the techniques described above, rotating parts may be machined to within 0.0001 inch of a desired diameter, an out of round tolerance in the order of 0.000060 inch, and a surface finish of five microinch, arithmetic average.

While the method described herein shows the machining of an exterior bearing surface of a rotating workpiece, it is to be understood that this method could also be performed on an inside bearing surface or on a flat surface. The essential steps of this method are therefore the machining at high current densities to provide fast machining rates and smooth surface finishes while utilizing a power supply having an essentially ripple free output, and then reducing the current density to a lower value such that the resulting surface finish has a bright appearance.

While the methods herein described, and the forms of apparatus for carrying these methods into effect, constitute preferred embodiments of the invention, it is to be understood that the invention is not limited to these precise methods, and that changes may be made therein without departing from the scope of the invention which is defined in the appended claims.

What is claimed is:

1. A method for machining a ferrous workpiece to form a surface of revolution thereon having a precise final predetermined dimension and a smooth surface finish, said method comprising the steps of
supporting the workpiece for rotation;
placing an electrochemical machining tool adjacent the workpiece to form a gap;
rotating the workpiece thereby to move the surface of the workpiece relative to said tool;
supplying a high velocity flow of electrolyte into said gap;
connecting a source of current having a ripple voltage variation less than one-half percent, peak to peak, between the tool and the workpiece such that the workpiece is anodic with respect to the tool to cause electrochemical machining of the workpiece as it moves past said tool;
maintaining the magnitude of the current density at a first predetermined level until the workpiece is machined to its final dimension to produce a smooth surface finish but which has an oxide coating thereon;
momentarily lowering the magnitude of said current density to a second predetermined level for at least one revolution of the workpiece to remove said oxide coating thereby to provide a bright surface finish which is as smooth as the surface finish produced by machining at said first current density; and
terminating said current flow in less than 100 microseconds after the entire machined surface of the workpiece has been exposed to said second predetermined level of current density.

2. The method as set forth in claim 1 further including the step of maintaining said gap at a predetermined distance throughout the machining operation by causing relative movement between said tool and the center of rotation as the workpiece is electrochemically machined.

3. The method as set forth in claim 1 wherein said gap between said tool and the workpiece decreases as the workpiece is electrochemically machined, wherein said source of current includes a source of variable voltage, and wherein the step of maintaining the magnitude of said current flow at said first predetermined level includes the step of reducing the voltage between said tool and the workpiece as said gap distance decreases.

4. The method as set forth in claim 1 wherein said gap between said tool and the workpiece increases as the workpiece is electrochemically machined, wherein said source of current includes a source of variable voltage, and wherein the step of maintaining the magnitude of said current flow at said first predetermined level includes the step of increasing the voltage between said tool and the workpiece as said gap distance increases.

5. The method as set forth in claim 1 wherein the step of adjusting the output from said source of current includes the further step of maintaining the voltage constant for at least one revolution of the part while limiting the peak current density to said first predetermined level to effect rounding up of the workpiece by removing the material on the workpiece which approaches closer to the tool at a faster rate than the remainder of the workpiece material.

6. The method as set forth in claim 1 wherein the step of adjusting the output from said source of current includes the step of maintaining the current density constant at said first predetermined level to permit removal of fixed amounts of workpiece material independent of variations in the surface configuration of the workpiece.

7. The method as set forth in claim 1 in which said current density at said predetermined first level is of the order of 6000 amperes per square inch, when machining a ferrous workpiece and using a sodium nitrate electrolyte.

8. The method as set forth in claim 1 wherein the magnitude of said first predetermined level of current density is greater than 3000 amperes per square inch and wherein the magnitude of said second predetermined level of current density is between 1500 and 3000 amperes per square inch, when machining a ferrous workpiece and using a sodium nitrate electrolyte.

9. A method as set forth in claim 1 in which said current density at said second predetermined level is not less than about 1500 amperes per square inch, when machining a ferrous workpiece and using a sodium nitrate electrolyte.

References Cited

UNITED STATES PATENTS

| | | | |
|---|---|---|---|
| 3,287,245 | 11/1966 | Williams | 204—224 |
| 3,445,372 | 5/1969 | Fromson | 204—212 |
| 3,458,424 | 7/1969 | Bender | 204—143 M |
| 3,285,843 | 11/1966 | Blake | 204—143 M |

L. C. EDMUNDSON, Primary Examiner

U.S. Cl. X.R.

204—129.1, 217, DIG 9